Figure 1:
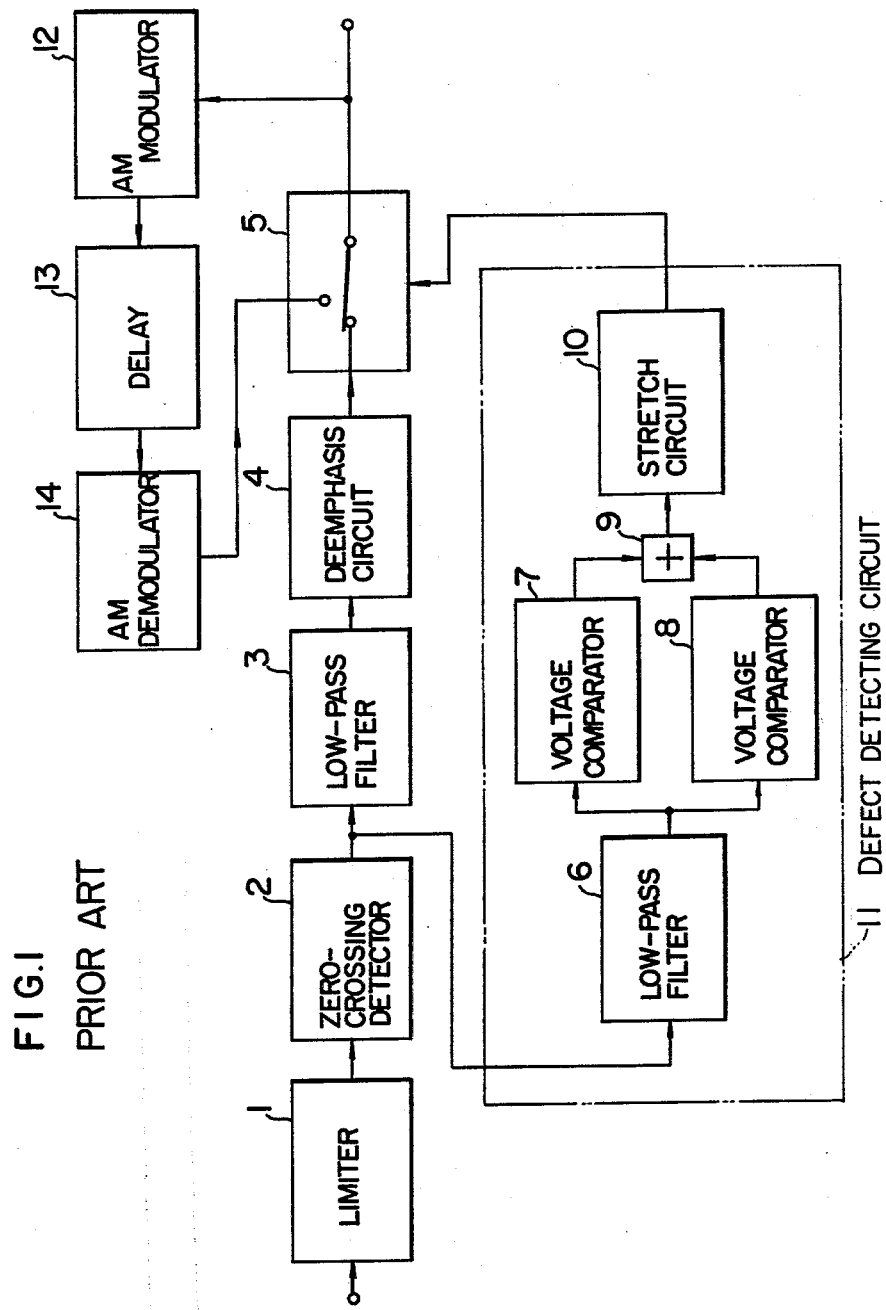

United States Patent [19]

Ushio et al.

[11] 4,189,745
[45] Feb. 19, 1980

[54] DEFECT DETECTING APPARATUS

[75] Inventors: Fusao Ushio, Hirakata; Noboru Okuno, Sennan, both of Japan

[73] Assignee: Matsushita Electric Industrial Co., Ltd, Osaka, Japan

[21] Appl. No.: 885,331

[22] Filed: Mar. 10, 1978

[30] Foreign Application Priority Data

Mar. 16, 1977 [JP] Japan .................. 52-29436

[51] Int. Cl.$^2$ .............................. H04N 5/76
[52] U.S. Cl. .................... 358/128.5; 360/38
[58] Field of Search ............ 360/38; 358/8, 127, 358/128

[56] References Cited

U.S. PATENT DOCUMENTS

| | | | |
|---|---|---|---|
| 3,909,518 | 9/1975 | Baker | 360/38 |
| 3,925,811 | 12/1975 | Kenney | 358/8 |
| 3,969,759 | 7/1976 | Amery | 358/8 |
| 4,001,496 | 1/1977 | Clemens et al. | 358/127 |
| 4,006,295 | 2/1977 | Oprandi et al. | 360/38 |
| 4,038,686 | 7/1977 | Baker | 360/38 |

Primary Examiner—Raymond F. Cardillo, Jr.
Attorney, Agent, or Firm—Stevens, Davis, Miller & Mosher

[57] ABSTRACT

A defect detecting apparatus for detecting a minor defect of a length in the order of a time period corresponding to one half cycle of a carrier included in a reproduced video signal which has been recorded in frequency modulation form or a defect of the reproduced signal due to irregular phase change of the carrier to correct the video signal is disclosed. The apparatus comprises a band-pass filter for extracting a spectrum component due to the defect distributed in a playback demodulator output frequency spectrum including a high-pass filter for attenuating a video signal component and a low-pass filter for attenuating a frequency-multiplied carrier component, and a level comparator which produces an output when an output level of the band-pass filter exceeds a predetermined level.

4 Claims, 22 Drawing Figures

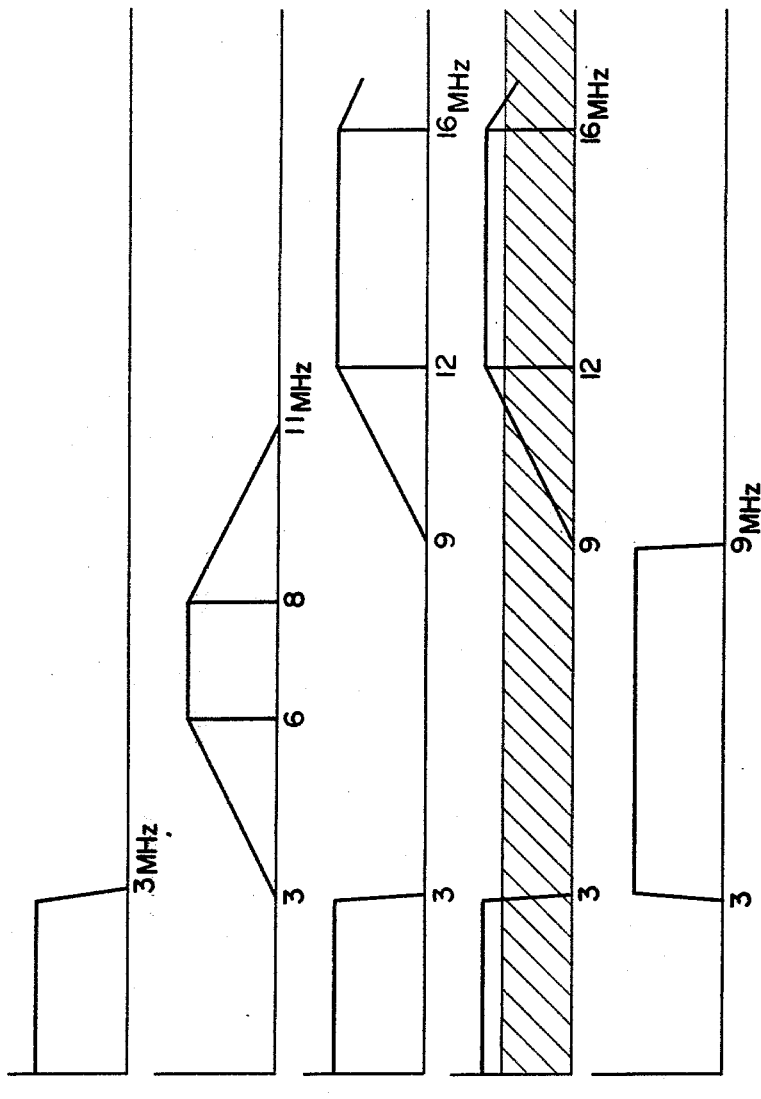

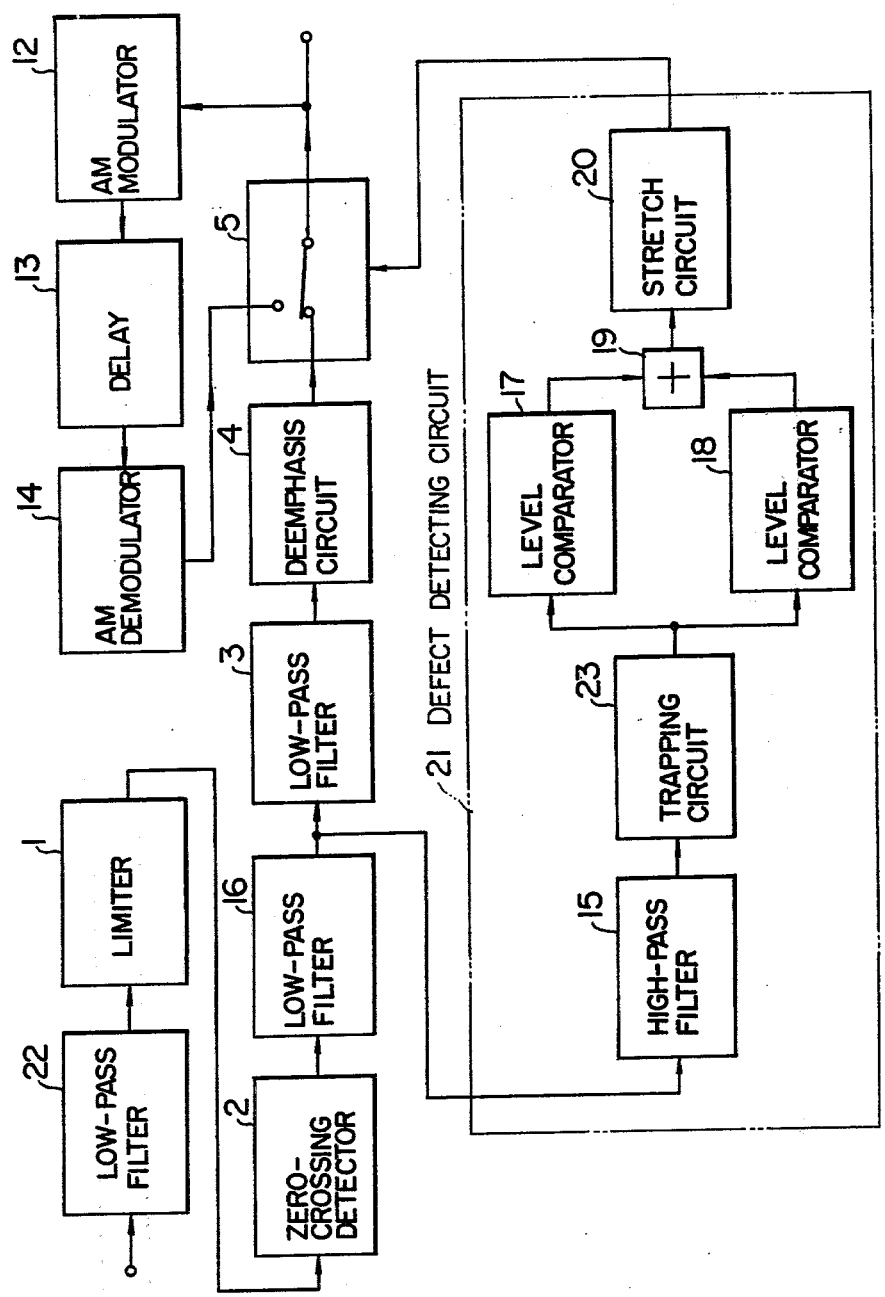

DEFECT DETECTING APPARATUS

The present invention relates to a defect detecting apparatus for correcting a defect in a reproduced video signal in reproducing the video signal which has been recorded in frequency modulation form, and it is an object of the present invention to detect a minor defect such as a defect of a length in the order of one half of a period of a frequency modulated carrier or a defect due to an irregular phase change of the carrier.

A video disk player for reproducing a video signal recorded on a disk has been known. In such a player, the video signal is recorded by a geometrical change on a surface of the disk and it is reproduced by converting the geometrical change to an electrical signal. In one type of player, in order to convert the geometrical change to the electrical signal, a record groove is scanned by a diamond stylus which is coupled to a mechanical-electrical transducing element (such as a piezoelectric ceramic element) to convert the geometrical change to a mechanical vibration, which is then converted to an electrical signal. In another type of player, the record groove is scanned by a stylus having a conductive electrode and a change in a capacitance of a capacitor constituted by the electrode, a dielectric layer on the disk and an underlying conductive layer is detected to produce an electrical signal. In yet another type of player, a narrowly focused laser beam is radiated toward the record disk and a reflected beam or transmitted beam therefrom is applied to a photo-electric transducing element to convert the change in the reflected beam or the transmitted beam caused by the geometrical change on the disk to an electrical signal to reproduce the signal recorded on the disk.

In the video disk players of the types described above, a signal suited for recording on the disk is a carrier which has been frequency modulated by a video signal. The frequency modulated signal reproduced from the disk is applied to a frequency modulated wave demodulator to reproduce the original video signal, which is then supplied to a television receiver through an appropriate signal processing circuit for displaying video information.

White and black spots sometimes appear in the displayed video information and this disturbance materially deteriorates the quality of the displayed image. Such disturbance is caused by a defect in the carrier reproduced from the record disk. In order to detect a defect in the reproduced signal in a video tape recorder (VTR) which magnetically records a signal on a magnetic material applied on a tape and reproduces the signal therefrom, a change in the amplitude of a reproduced carrier is detected to activate a defect detecting circuit when the amplitude of the carrier falls below a predetermined level. The defect in the VTR is usually caused by the peeling-off of magnetic material or the dust attached to a space between the tape and a read head. When such a defect occurs, a head output signal is materially lowered or completely disappears. Accordingly, the defect in the reproduced signal can be detected by detecting the change in the amplitude of the reproduced carrier. Since a disturbance occurs in the reproduced image by the reduction of the level of the reproduced signal or the absence of the reproduced signal, such a defect is generally referred to as dropout.

When the carrier recorded on the disk is reproduced by the means described above, a similar noise to that which appeared in a VTR appears in the reproduced image. There are many causes therefor. For example, it may be caused by dust attached on the record disk, a scratch on the surface of the disk or wear of the recorded signal pattern. In order to detect the defect in the reproduced signal caused by the above causes, the change in the amplitude of a reproduced carrier may be detected like in the case of the VTR. In fact, it has been proved that the detection of the defect in the signal reproduced from the disk by such means is effective for a relatively large defect. However, it has been difficult to detect a relatively small defect by detecting the change in the amplitude of the reproduced carrier. A study on relatively small defects has revealed that not only the amplitude of the carrier is lowered at the area of the defect but also noise of much higher amplitude than the amplitude of the carrier is mixed with the carrier or the amplitude of the carrier changes or the carrier drops out over a very short period equal to or less than a period corresponding to one wavelength of the reproduced carrier, or only the phase of the carrier changes irregularly. It is thus difficult to detect defects by a means for detecting a change in the amplitude of the reproduced signal.

The present invention has resolved the above difficulties by noting the distribution of a frequency spectrum in a demodulator output of a signal including a defect, and by detecting the defect by the spread of the spectrum caused by the defect in the signal.

Figure 2A:
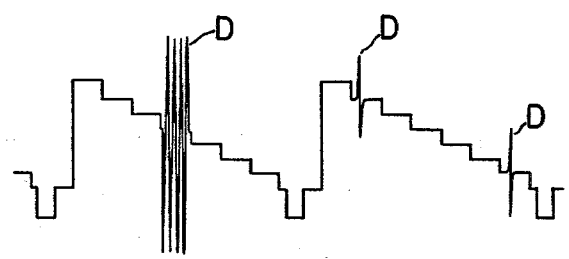
Figure 2B:
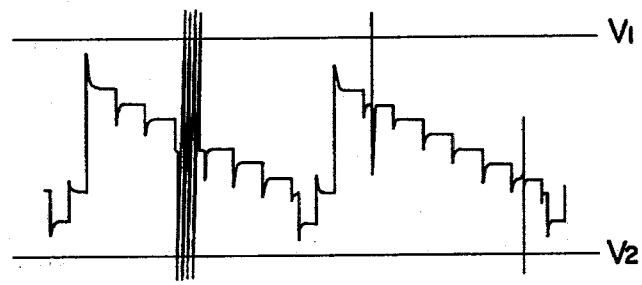
Figure 2C:
Figure 2D:
Figure 2E:

The present invention is now fully explained with reference to the accompanying drawings, in which;

FIG. 1 is a block diagram showing an example of a prior art defect detecting circuit:

FIGS. 2A to 2F are waveform diagrams for explaining the operation of the circuit shown in FIG. 1, wherein FIG. 2A shows the output waveform of a low pass filter 3, FIG. 2B shows the output waveform of a low pass filter 6, FIG. 2C shows the output waveform of a voltage comparator 7, FIG. 2D shows the output waveform of a voltage comparator 8 and FIG. 2E shows the output waveform of an adder circuit 9.

Figure 3A:
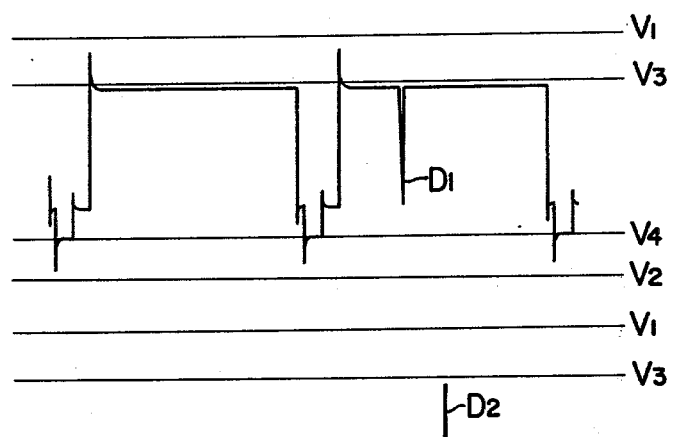
Figure 3B:
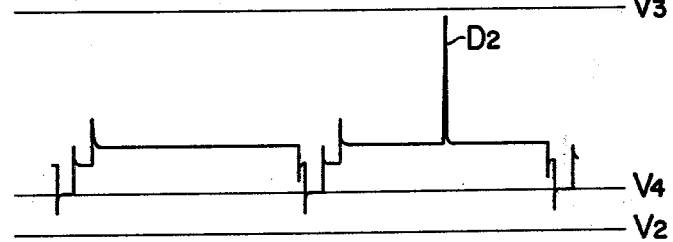

FIGS. 3A and 3B are also waveform diagrams for explaining the operation of the circuit shown in FIG. 1, wherein FIG. 3A shows the output waveform of a low pass filter 6 with a relatively bright-image signal, and FIG. 3B shows the output wave form of a low pass filter 6 with a relatively dark-image signal.

FIGS. 4A to 4E show frequency spectra for explaining a principle of the present invention. FIG. 4A shows the spectrum of a video signal to be recorded, FIG. 4B shows the spectrum of the above video signal modulated in frequency, FIG. 4C shows the spectrum of the output signal of a zero crossing detector, FIG. 4D shows a spectrum distribution of the output signal of the zero crossing detector responsive to the defect including reproduced signal, and FIG. 4E shows the characteristic diagram of a bandpass filter used in the present invention.

Figure 5:
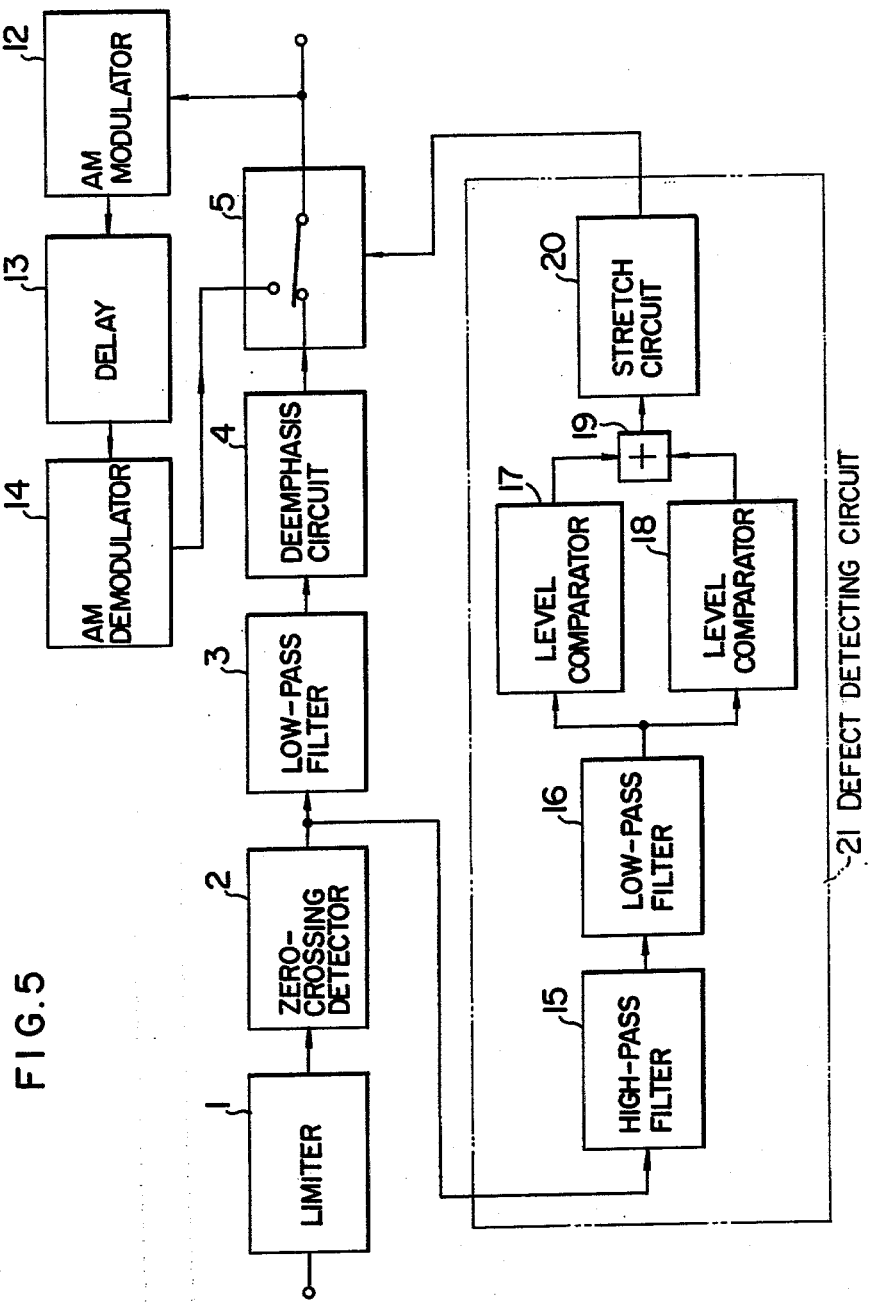
Figure 6A:
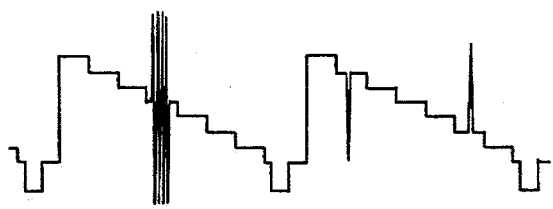
Figure 6B:
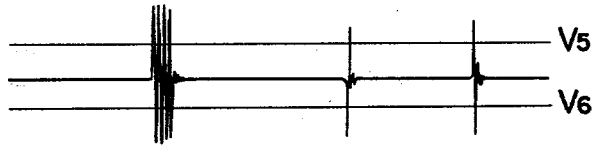
Figure 6C:
Figure 6D:
Figure 6E:
Figure 6F:

FIG. 5 is a block diagram showing one embodiment of a defect detecting circuit of the present invention;

FIGS. 6A to 6F are waveform diagrams explaining the operation of the circuit shown in FIG. 5, wherein FIG. 6A shows the output waveform of a deemphasis circuit 4, FIG. 6B shows the output waveform of a low pass filter 16, FIG. 6C shows the output waveform of a level comparator 17, FIG. 6D shows the output waveform of a level comparator 18, and FIG. 6F shows the output waveform of a stretch circuit 20.

FIG. 7 is a block diagram illustrating another embodiment of the present invention.

Figure 2F:

FIG. 1 shows the known means for detecting a minor defect. In FIG. 1, numeral 1 denotes a limiter to which a signal read out of a record disk is applied and which suppresses an amplitude variation of the signal. Numeral 2 denotes a zero-crossing detector which produces a pulse of a constant amplitude, a constant duration and a constant polarity at each zero-crossing point of the rise and the fall of a limiter output. Thus the detector 2 multiplies the carrier frequency, and generates output pulses the spacing of which changes in accordance with the output signal frequency of the limiter 1. The pulse output signal of the zero crossing detector 2 contains this voltage changing component represented by the change in the spacing of the pulses which corresponds to the video signal component, together with the frequency-multiplied carrier wave component. Accordingly the zero crossing detector 2 produces a voltage changing component corresponding to the change in the frequency of the input carrier wave, and for all practical purposes constitutes a frequency-voltage converting means. The detector 2 therefore produces a video signal component. Numeral 3 denotes a low-pass filter which has the same pass band as the band of the video signal. It attenuates a frequency component which is twice as high as the frequency of the carrier and other spurious or undesired components included in the output of the zero-crossing detector 2 and extracts only the video signal component and demodulates the video signal. A pulse count type demodulator or a delay type demodulator has been known as the demodulator of the type described above. Numeral 4 denotes a deemphasis circuit which carries out a predetermined deemphasis. An output signal from the deemphasis circuit 4 therefore produces a correct form of a video signal. Numeral 5 denotes a switching circuit which normally passes the video signal from a demodulator. Numeral 12 denotes an AM modulator circuit which amplitude-modulates a given carrier with the output signal of the switching circuit 5. Numeral 13 denotes a delay circuit which has a delay time which is an integer multiple of one horizontal scan time of a television system, and it imparts the given delay to the amplitude modulated signal. Numeral 14 denotes an AM demodulator which demodulates the signal from the delay circuit 13 to produce a signal which has been delayed with respect to the output signal of the switching circuit 5 by a period of time which is an integer multiple of one horizontal scan time. The switching circuit 5 is actuated by a signal from a defect detecting circuit 11 so that it produces the signal from the AM demodulator 14, which signal has been delayed by the period of time which is the integer multiple of one horizontal scan time, when a defect is included in the reproduced signal. Numeral 6 denotes a low-pass filter which has a much higher cutoff frequency than the low-pass filter 3, numeral 7 denotes a first voltage comparator which determines whether or not a voltage equal to or higher than a predetermined D.C. voltage level is applied to the input thereof, and numeral 8 denotes a second voltage comparator which determines whether or not a voltage equal to or lower than a predetermined D.C. voltage level is applied to the input thereof. Numeral 9 denotes an adding circuit for logically adding the outputs of the first and second voltage comparators 7 and 8. Numeral 10 denotes a stretching circuit for stretching a trailing edge of a pulse from the adder 9. The waveforms at various points in the circuit of FIG. 1 are shown in FIG. 2, in which FIG. 2A shows an output waveform of the demodulator which includes defects D, and FIG. 2B shows an output waveform of the low-pass filter 6 having wider band. Because no deemphasis is carried out, a high frequency component in the video signal is emphasized and a noise component caused by the defect is also emphasized as shown. $V_1$ and $V_2$ in FIG. 2B represent voltage compare levels for the voltage comparators 7 and 8, respectively. FIG. 2C shows an output of the voltage comparator 7 and FIG. 2D shows an output of the voltage comparator 8. Those outputs are produced when the input voltages exceed the levels $V_1$ or $V_2$, respectively. FIG. 2E shows an output of the logical adder circuit 9 which produces a logical sum of the outputs of the voltage comparators 7 and 8. FIG. 2F shows an output waveform of the stretch circuit 10. Since the trailing edge of the pulse is stretched, a train of short duration pulses are converted to a single pulse and a short duration pulse is converted to a pulse having at least a given duration. In this manner, the defect in the demodulator output can be detected.

The detection method described above is based on the following two assumptions. Firstly, the carrier frequency of the frequency modulated wave shifts only within a given frequency range and the frequency shift beyond that range is not due to a correct signal but due to a defect in the reproduced carrier. Secondly, any defect in the video signal which results in obstruction of the image is caused by a defect in an input signal which shifts the instantaneous carrier frequency far beyond a given shift range. Because of those assumptions, in the detection system shown in FIG. 1, the input to the level comparator must be the video signal containing a D.C. component. Furthermore, because of the over-modulation due to the preemphasis, the reference voltage of the voltage comparator must be set to a level which is much higher than a D.C. voltage level appearing at the output of the low-pass filter 6 when a frequency of maximum nominal frequency shift of the frequency modulated wave is applied and to a level which is much lower than a D.C. voltage level appearing at the output of the low-pass filter 6 when a frequency of minimum nominal frequency shift is applied.

However, observation of the output waveforms actually reproduced from the signal recorded on the disk prove that the above assumptions are not always correct. Referring to FIG. 3, this will be explained based on the results of this observation. FIG. 3A shows an output waveform of the low-pass filter 6 for a relatively bright image, and $V_3$ represents a D.C. output level of the demodulator for a nominal maximum shift frequency and $V_4$ represents a D.C. output level of the demodulator for a nominal minimum shift frequency. $V_1$ and $V_2$ represent reference voltage levels for the voltage comparators 7 and 8, respectively, for detecting the defect, which levels have been determined taking the over-modulation level due to the preemphasis into consideration. The levels $V_1$ and $V_2$ must be set far from the level $V_3$ and $V_4$, respectively. In this case a very small defect $D_1$ was actually observed. However, it is not detected by the voltage comparator 7 or 8 because a peak of the defect $D_1$ is directed to a dark level of the video signal but does not exceed the level $V_2$. FIG. 3B shows an output waveform of the low-pass filter 6 for a relatively dark image. A very small defect $D_2$ in the reproduced signal was actually observed. However, it is not detected by the voltage comparator 7 or 8 because a peak of the defect $D_2$ does not exceed the level $V_1$. In a video disk player which records and reproduces the signal on and from the disk, these very small defects occur relatively frequently and they appear as white or black spots in a brightness signal or they are mixed in a chrominance signal resulting in unnatural color noise, which degrades the quality of the reproduced image.

Through a detailed study of such small defects, it has become clear that pulse-like noise is involved in the carrier wave at the place where such a noise was generated due to dirt or dust attached onto the recording disk, scratches thereon, etc. Such noise having a larger amplitude than that of the carrier wave, the lack of dropout of the carrier wave, or an irregular phase variation of the carrier wave is caused in a time duration equal to or less than one period of the wavelength of the carrier.

The present invention is directed to detect these small defects in the signal. A basic principle of the present invention is that instead of detecting the defect in the signal by noting the D.C. level in the output of the demodulator and detecting a signal which exceeds a reference D.C. level as is done in the prior art method, the defect is detected by observing the distribution of the frequency spectrum in the demodulator output signal which includes the defect and detecting the defect by the spread of the spectrum caused by the defect in the signal.

The present invention is now explained in detail. Referring to FIG. 4, a basic concept of the present invention is explained. FIG. 4A shows a spectrum of a video signal a band of which has been limited within a given band width, e.g. 3 MHz in order to enable recording in frequency modulation form. This signal is frequency modulated within a given frequency shift, e.g. 6-8 MHz by a frequency modulator and then recorded on a disk. The recorded signal is thereafter read by a pickup means. A frequency spectrum of the readout signal is shown in FIG. 4B, in which side bands spread on both sides of the frequency shift. The spread extends from 3 MHz to 11 MHz for the illustrated frequency shift. The signal is then supplied to the zero-crossing detector through the limiter. FIG. 4C shows a spectrum of an output signal of the zero-crossing detector, in which the carrier is frequency multiplied to 12-16 MHz, for example, and the side bands spread on both sides thereof. Since the zero-crossing detector also constitutes the frequency-voltage converting means, the recorded video signal component is also included in the output thereof. Accordingly, the video signal can be demodulated by extracting only the video signal component by the low-pass filter having the same pass band as the band of the video signal. It has been proved that the frequency spectrum at the output of the zero-crossing detector when any defect is included in the reproduced signal spreads as shown by hatching in FIG. 4D. Since the defect in the picked-up signal occurs quite independently from the recorded signal, the spectrum thereof has an infinite spread at the output of the zero-crossing detector and spreads throughout the frequency band of the demodulated video signal and throughout the frequency band of the frequency-multiplied carrier. It is seen from the frequency spectrum that because of the frequency multiplication of the carrier there is a band in which neither the video signal nor the carrier component is distributed and only the irregular spectrum caused by the defect of the reproduced signal is distributed. This band spreads over 3-9 MHz when the band width of the video-signal is 3 MHz and the frequency deviation is 6-8 MHz. Thus, the defect in the reproduced signal can be detected by extracting only that band by a band-pass filter having a pass band as shown in FIG. 4E.

FIG. 5 shows a block diagram of one embodiment of a defect detecting circuit of the present invention based on the above principle. Numeral 1 denotes a limiter, numeral 2 denotes a zero-crossing detector, numeral 3 denotes a demodulating low-pass filter, numeral 4 denotes a deemphasis circuit and numeral 5 denotes a switching circuit, which is normally connected to pass a signal from the deemphasis circuit 4. Numerals 12, 13 and 14 denote the same circuits as the corresponding ones in FIG. 1. Those circuits function to delay the video signal by a time period which is equal to an integer multiple of one horizontal scan time. When a defect detecting circuit 21 detects a defect, the switching circuit 5 is connected to pass a signal from the AM demodulator 14 to correct or compensate for the defect in the reproduced signal. The defect detecting circuit 21 comprises the following units. Numeral 15 denotes a high-pass filter which attenuates a video signal component in an output of the zero-crossing detector 2. Numeral 16 denotes a low-pass filter which attenuates a frequency-multiplied carrier component. Numerals 17 and 18 denote level comparators respectively, wherein the level comparator 17 receives an input AC signal from the low pass filter 16 to generate an output pulse during the time the input AC signal exceeds a predetermined definite voltage level in the positive going direction (this voltage level being a predetermined voltage above the AC or center axis of the input AC signal), and the other comparator 18 receives the input AC signal to generate an output pulse during the time the input AC signal exceeds another predetermined definite voltage level in the negative going direction (this voltage level being a voltage below the AC axis of the input AC signal). Numeral 19 denotes an adder which logically adds the output pulses of the level comparators 17 and 18. Numeral 20 denotes a stretch circuit which stretches a trailing edge of an input pulse. It reshapes the input pulse to produce a defect detecting pulse. A pass band of the band-pass filter comprising the filters 15 and 16 is an important factor in the present embodiment. In actual fact, the video signal includes more low-frequency components and less high-frequency components, and when it is frequency modulated such that a synchronizing signal appears at a low frequency band as shown in FIG. 4, the shift range of the portion representative of the video information including more high-frequency components is brought to a higher frequency range of the shift frequency (for example, if an amplitude of the synchronizing signal is equal to 30% of an amplitude of the video signal and the frequency shift is 6-8 MHz, the shift range of the portion representative of the video information is 6.6-8 MHz) so that a band in which a strong side band wave spectrum is distributed spreads in a relatively high frequency region in the side band wave frequency band. An experiment of reproducing a signal recorded under the above condition and detecting the defect included therein has proved that the defect in the reproduced signal can be detected in a stable manner without disturbance by the video signal and the side band waves of the carrier even when the pass band of the band-pass filter is set to 2.5-10 MHz. When a NTSC signal is recorded directly, a chrominance signal distributes in a high frequency band. Accordingly, the cutoff frequency of the high-pass filter must be set to be higher than the band of the video signal so that the chrominance signal is fully attenuated.

FIG. 6 shows waveforms at various points in the block diagram of FIG. 5. FIG. 6A shows a demodulator output waveform including a defect, that is, an output waveform of the deemphasis circuit 4 shown in FIG. 5. FIG. 6B shows an output waveform of the band-pass filter comprising the filters 15 and 16 shown in FIG. 5. The output component of the band-pass filter is caused by the defect in the reproduced signal. When the pass band of the band-pass filter is selected to be relatively wide as described above, the output components comprise a portion of very high frequency components of the video signal, a portion of a relatively low frequency components of side band wave components caused by the frequency multiplied carrier, and fundamental wave components of the carrier and the side band waves which slightly remain in view of the unbalance in a frequency multiplier circuit due to the unbalance in the limiter and the zero-crossing detector. Those components can be suppressed to a sufficiently small level to compare with the component produced by the defect. $V_5$ and $V_6$ represent reference levels for the level comparators 17 and 18, respectively. Those levels are slightly away from the center of the A.C. voltage. The differences between the center of the A.C. voltage and the reference levels enable the prevention of the erroneous operation of the defect detecting circuit due to the spurious or undesired components described above. FIGS. 6C and 6D show output waveforms of the level comparators 17 and 18, and FIG. 6E shows an output waveform of the adder 19. This output waveform comprises a train of short duration pulses, which do not exactly correspond to the positions of the defects in the reproduced signal. Accordingly, the trailing edges of those pulses are stretched by the stretch circuit 20 to produce defect detecting pulses as shown in FIG. 6E. The amount of stretch for the trailing edge of the pulse should be selected to be longer than a time period corresponding to one wavelength of the cutoff frequency of the high-pass filter 15.

FIG. 7 shows a block diagram of another embodiment of the present invention. Those elements having similar functions to elements shown in FIG. 5 are designated by the same reference numerals. Numeral 22 denotes a low-pass filter to which a picked-up signal is applied and a cutoff frequency of which is selected to attenuate a second harmonic component in the picked-up signal. This assures good balance in the limiter circuit 1 and the zero-crossing detector 2 and prevents erroneous operation of the defect detecting circuit 21. For example, when the band width of the video signal is 3 MHz, and the frequency shift is such that the high frequency edge of the synchronizing signal is at 4.3 MHz and the white peak is at 6.3 MHz, the characteristic of the low-pass filter 22 is to be selected such that it attenuates the components of equal to or higher than 8.6 MHz which is twice as high as the lowest shift frequency of 4.3 MHz. Numeral 16 denotes a low-pass filter which attenuates the frequency multiplied carrier component included in the output of the zero-crossing detector 2. Under the condition described above, the cutoff frequency of the filter 16 is to be selected to approximately 7.0 MHz. Spurious components included in the output of the low-pass filter 16 are attenuated by the low-pass filter having the same pass band as the band of the video signal, and the output of the low-pass filter 3 is deemphasized by the deemphasis circuit 4 to reproduce the video signal. Numeral 21 denotes the defect detecting circuit. The output of the low-pass filter 16 is also applied to the high-pass filter 15 having the cutoff frequency of 2.5 MHz, for example, to attenuate most components of the video signal, and the output of the high-pass filter 15 is then applied to a trapping circuit 23, which selectively attenuates a portion of the fundamental wave component of the carrier which remains due to unbalances in the pickup circuit, the limiter circuit and the zero-crossing circuit. The trapping frequency is preferably selected to 4.3 MHz which corresponds to the frequency at the high frequency edge of the synchronizing signal. The output of the trapping circuit 23 is applied to the level comparators 17 and 18 to detect the defect in the reproduced signal. By applying the output of the low-pass filter 16 simultaneously to the demodulating low-pass filter 3 and the defect detecting circuit 21 as shown in FIG. 7, the delay of detection by the defect detecting circuit 21 can be compensated for. When the video signal to be recorded on the disk includes a burst, for example, in case of a known buried subcarrier system or a direct recording system of an NTSC signal, it is effective to select the tuning frequency of the trapping circuit 23 to be equal to the frequency of the frequency shift of the carrier at which the burst is located. When the shift frequency of the carrier is relatively low, the cutoff frequency of the high-pass filter 15 of the defect detecting circuit is to be selected to several hundred KHz and the levels $V_5$ and $V_6$ shown in FIG. 6B are to be selected to be relatively high.

As described hereinabove, the present invention provides the defect detecting circuit which can detect the minor defect in the reproduced signal which is produced in the video disk player, in a stable manner with a simple construction. It should be understood that the application of the present invention is not limited to the video disk player but can be expanded to other apparatus which records a signal in frequency modulated form and reproduce the signal.

What is claimed is:

1. In a system for reproducing from a recording medium a video signal having a predetermined frequency band recorded as a frequency-modulated video signal having a predetermined frequency shift, an apparatus for detecting a signal defective portion in the reproduced video signal which comprises:

a frequency demodulator comprising zero-crossing detector means for frequency-demodulating the reproduced frequency-modulated video signal to produce a frequency-demodulated output signal and a low-pass filter for deriving a video signal of said predetermined frequency band from said demodulated output signal;

filtering means for receiving the demodulated video signal from said zero-crossing detector to produce a filtered output signal, said filtering means having a low cut-off frequency substantially above the highest frequency of said predetermined frequency band of said video signal and having a high cut-off frequency below twice the lower limit frequency of the frequency shift of said frequency-modulated video signal;

a first level comparator for receiving said filtered output to generate a first output signal when said filtered output becomes larger than a first predetermined level;

second level comparator for receiving said filtered output to generate a second output signal when said filtered output becomes smaller than a second predetermined level which is predetermined to be smaller than said first predetermined level; and adder means for adding said first and second output signals of said first and second level comparators to produce an output signal representing the signal defective portion in said reproduced video signal.

2. An apparatus according to claim 1, wherein said filtering means comprises a low-pass filter having a cut-off frequency below twice the lower limit frequency of the lower side band of said frequency-modulated video signal, and a high-pass filter having a low cut-off frequency above the highest frequency of said predetermined frequency band of said video signal.

3. An apparatus according to claim 2, wherein said frequency-demodulated output signal of said zero-crossing detector is applied to said low-pass filter means included in said filtering means, said low-pass filter means in said filtering means producing an output signal which is applied to said low-pass filter included in said frequency demodulator means.

4. An apparatus according to claim 2, further comprising a trapping circuit for attenuating selected frequency components within a pass band of said filtering means.

* * * * *